United States Patent [19]

Lehmkuhl

[11] Patent Number: 4,579,487

[45] Date of Patent: Apr. 1, 1986

[54] TOOL ADAPTER

[76] Inventor: Robert A. Lehmkuhl, 7 Klara Ct., Madison, N.J. 07940

[21] Appl. No.: 651,474

[22] Filed: Sep. 17, 1984

[51] Int. Cl.[4] .......................... B23C 1/00; B23B 47/18
[52] U.S. Cl. ...................................... 409/134; 408/6; 408/11; 409/187; 409/194; 409/196
[58] Field of Search ............... 29/26 A, 568; 409/187, 409/136, 194, 196, 148; 408/11, 56, 10, 6

[56] References Cited

U.S. PATENT DOCUMENTS

| 3,566,719 | 3/1971 | Smith | 408/11 |
| 3,995,528 | 12/1976 | Rethwish | 409/194 |
| 4,131,837 | 12/1978 | Whetham | 408/11 X |
| 4,180,356 | 12/1979 | Hoch | 408/11 |
| 4,185,376 | 1/1980 | Johnstone | 409/136 X |
| 4,260,305 | 4/1981 | Clopton | 409/134 |

FOREIGN PATENT DOCUMENTS

| 101307 | 8/1980 | Japan | 408/11 |
| 77403 | 5/1983 | Japan | 408/11 |
| 58-94905 | 6/1983 | Japan | 408/11 |
| 301230 | 4/1971 | U.S.S.R. | 408/11 |

Primary Examiner—William R. Briggs
Attorney, Agent, or Firm—Edward J. Utz

[57] ABSTRACT

A tool adapter for use in drilling, tapping and milling operations with the spindle of a machining center having a collet type tool holder which holds the tool which upon advancement into the work piece at a programmed feed rate to a programmed depth rate utilizes a spring loaded unit to signal the computer numerical control through a transducer of the machining center in the event a tool is broken during the machining operation to automatically stop said operation.

7 Claims, 19 Drawing Figures

TOOL ADAPTER

My invention comprises a telescopic tool adapter of the type used in modern machining centers and is used in conjunction with automatic tool changers for loading into and unloading from the machine spindle.

The principal object of my invention is to provide machining centers with a device to sense the surface of a workpiece with random length tools which devices work in conjunction with computer numerical controls (CNC) or similar devices and are manufactured in a variety of sizes and configurations to accomodate the various types of machining centers and tools.

Previous to my invention it was necessary to reference the tool to a position known as the "R" plane, therefore another object of my invention is to eliminate the necessity for the reference plane, thereby reducing the cycle time.

Still another object of my invention is to eliminate in programming of the workpiece the "R" plane dimension, since the "R" plane is determined by the surface sensing feature.

Another object of my invention is to eliminate the use of preset tools or set-up time for setting tool length offsets.

Another object of my invention is to provide a tool adapter having an integral mounted torque arm to work in conjunction with a machine mounted transducer or limit switch.

Another object of my invention is to provide for broken tool detection during machining and after machining and for breakthrough sensing.

Another object of my invention is to eliminate feed rate programming tapping operation by permitting the Z axis to follow the tap into and out of the hole.

Still another object of my invention is to provide a surface sensing tool adapter that can be loaded in the machine spindle and retains orientation of the torque arm while stored.

Another object of my invention is to verify the presence of a tool by utilizing a limit switch.

In CNC machining centers, non-telescoping tool adapters are used in conjunction with an "R" plane setting and thereafter cycling to the "R" plane setting, and measuring the distance from tool point to the work surface and manually adjusting the tool length for each tool used. Alternatively, manually present tools are employed. Another method is to utilize spindle and table probe cycles which are time-consuming and expensive.

To oversome these economic disadvantages, I have provided the use of a telescopic tool holder for milling, drilling and tapping which consists of an adapter having a tool body arranged to be retained in the taper of the machine spindle. A spring-loaded sliding tool holder is fitted to the bore of the tool body, driven by a key and retained by a flange. A torque arm is mounted to the tool body by means of sealed bearings and a sliding sleeve which is axially and radially connected to the tool holder by means of a tool holder chip guard.

A spring-loaded adapter plunger is mounted to the torque arm and is used to release an orientation retention latch and engages a transducer unit while being inserted in the machine spindle during an automatic or manual tool change.

The spring-loaded device in the transducer unit has a stronger spring than the transducer plunger, thereby causing the plunger to be seated in the torque arm.

Working in conjunction with the tool adapter is a machine mounted transducer unit mounted adjacent to the spindle bearing housing.

I prefer a transducer unit consisting of a spring-loaded piston attached to a linear transducer actuator and a limit switch trip dog. The piston operates in a cylinder which supports a variable displacement transducer body and a precision limit switch. A tool present limit switch is fitted to the center line of the piston.

DRILLING

A variety of tool adapters can be used to accomodate the type of machining required. For drilling operations with a machining center, a tool adapter arranged with a collet type tool holder is generally used. The collet assembly is mounted in the sliding tool holder.

In the drilling operation, the spindle tool adapter is moved to the work surface at a rapid traverse rate until the drill contacts the work surface. At this point, the drill stops advancing, but the spindle axis continues to move toward the work surface. This causes the tool holder to telescope into the tool body which is turn causes the torque arm plunger to move a spring-loaded piston in the transducer unit. This motion causes a trip dog to trip a precision limit switch and a transducer actuator to move with respect to a transducer body. The limit switch signal is used as a safety interlock to stop the spindle axis motion if there is not the proper signal from the transducer circuit.

In a drilling cycle, the spindle axis will continue to move toward the work surface, but at an ever-decreasing rate that is controlled by the ever-changing position of the transducer actuator in relation to the transducer body. This change in relationship causes the signals being output by the transducer to an axis velocity control circuit in the machine CNC (Computer Numerical Control) to decelerate the spindle axis to zero velocity within the telescoping travel of the tool adapter. When full adapter travel is reached, the tool holder is seated solidly in the adapter body, thereby being able to transmit thrust to the tool. The full adapter travel is also coincidental with the null position of the transducer causing the transducer to send a signal to the machine CNC control to trigger the positioning detecting circuit. This signal immediately causes the spindle axis to feed the drill into the workpiece at a programmed feed rate to a programmed depth measured from the signal point which is the work surface. At the programmed depth, the spindle will retract to a point that brings the tool clear of the work surface if another hole is to be drilled or the spindle will retract to a tool change position if another tool is required.

If the drill breaks before the programmed depth is reached, the spring-loaded tool holder will unseat in the adapter body. This action will cause the torque arm to move, allowing the spring-loaded transducer piston to move the transducer actuator in relation to the transducer body. The transducer will signal an out of null condition to the CNC, thereby causing the machining cycle to be held up until the conditions are corrected.

In advanced CNC logic, the initial surface sense position can be put in memory. This information can be used to determine if a drill was broken on a previous operation but went undetected. If the drill was broken, the surface sense position of the new cycle would be different than that with a full length drill. This difference in position will cause the machine cycle to be held up until the problem is corrected.

If broken tool detection is not required, then this same logic and tool adapter action can be used to sense when a drill has broken through the workpiece thickness. This may be the case when using larger diameter drills for drilling through holes from irregular surfaces of large castings or weldments.

TAPPING

For tapping operations, a telescoping tool adapter similar to the one used for drilling is used in conjunction with the drilling transducer unit, the difference being in the construction of the sliding tool holder. Instead of a collet holder, a conventional tap driver is used. The tap driver can be either torque-limiting or not.

In operation, the spindle tool adapter is moved to the work surface at a rapid traverse rate until the non-rotating tap contacts the work surface. At this point, the tap stops advancing, but the spindle axis continues to move toward the work surface. This causes the tool holder to telescope into the tool body which, in turn, causes the torque arm plunger to move a spring-loaded piston in the transducer unit. This motion causes a trip dog to trip a precision limit switch and a transducer actuator to move with respect to a transducer body. The limit switch signal is used as a safety interlock to stop the spindle axis motion in the absence of the proper signal from the transducer circuit.

In a tapping cycle, the spindle axis will continue to move toward the work surface, but at an ever-decreasing rate that is controlled by the ever-changing position of the transducer actuator in relation to the transducer body. This change in relationship causes the signals being output by the transducer to an axis velocity control circuit in the machine CNC control to decelerate the spindle axis to zero velocity within one-half of the telescoping travel of the tool holder and one-half the travel of the transducer actuator. This amount of travel in the tapping mode causes the transducer to output a null signal to the CNC control. This signal immediately causes the spindle to rotate at the programmed speed. The tool holder spring pressure will cause the tap to feed into the workpiece. As the tap feeds into the workpiece, the transducer unit is displaced to one side of the tapping null position, this displacement will signal the computer numerical control to feed the spindle into the work piece, at the rate the tap is advancing, the amount of displacement is determined by the following error of the spindle axis servo system.

The control will track the position of the spindle axis and, at a depth programmed from the work surface, which was established when the transducer null signal was first triggered, the spindle will be reversed. The tap will then cause the tool to telescope into the tool adapter, which will cause the transducer unit to pass through the null position. In this case, the signal will come from the opposite side of null which will cause the spindle axis to retract or move away from the work surface. It will continue to move away until the tap clears the work part if another hole is to be tapped, or the spindle will retract to a tool change position if another tool is required.

If, when using a non-torque limit tap driver, the tap should break before the programmed depth is reached, two possible events may take place. If the tap disintegrates and a large portion of the tap length is thrown clear, the spring-loaded tool holder will move rapidly away from the previous position and a gross out of null signal will occur. If there is no portion of the tap thrown clear, the spindle axis will continue to advance slightly until a null position is reached because a broken tap will not advance into the work.

In either case, the transducer will signal the CNC control that an improper transducer position is present, thereby causing the machine cycle to be held up until the conditions are corrected.

If, when using the torque-limiting tap driver the tap becomes dull, the tap driver will stall and the tap will stop advancing before the programmed depth is reached. This will cause the spindle axis to advance slightly until the null position is reached. The transducer will signal the CNC control that an improper transducer position is present, thereby causing the machine cycle to be held up until the conditions are corrected.

If, on a previous machining operation, a hole for the tap to enter has not been drilled, the tap cannot begin to feed from the surface sense position. After an appropriate amount of time, the CNC control will recognize that an initial out of null condition did not occur, thereby causing the machine cycle to be held up until the conditions are corrected.

In advanced CNC logic, the initial surface sense position can be put in memory. This information can be used to determine if a tap was broken on a previous operation, but went undetected. If the tap was broken, the surface sense position of the new cycle would be different than that with a full-length tap. This difference in position will cause the machine cycle to be held up until the problem is corrected.

MILLING

For milling operations, a telescoping tool adapter similar to the one used for drilling is used in conjunction with the drilling transducer unit, the difference being that the milling adapter is arranged to stay in the telescoped or compressed state during milling. The tool holder portion of the adapter is also arranged to mount the various types of milling cutters or, in some cases, single-point fly cutters.

In operation, the spindle tool holder adapter is moved to the work surface at a rapid traverse rate until the non-rotating cutter contacts the work surface. At this point, the cutter stops advancing, but the spindle axis continues to move toward the work surface. This causes the tool holder to telescope into the tool body, which, in turn, causes the torque arm plunger to move a spring-loaded piston in the transducer unit. This motion causes a trip drog to trip a precision limit switch and a transducer actuator to move with respect to a transducer body. The limit switch signal is used as a safety interlock to stop the spindle axis motion if there is not the proper signal from the transducer circuit.

In a normal milling cycle, the spindle axis will continue to move toward the work surface, but at an ever-decreasing rate that is controlled by the ever-changing position of the transducer actuator in relation to the transducer body. This change in relationship causes the signals being output by the transducer to an axis-velocity control circuit in the machine CNC control to decelerate the spindle axis to zero velocity within telescoping travel of the tool adapter. When full adapter travel is reached, the tool holder is seated solidly in the adapter body, thereby being able to transmit thrust to the tool. The tool holder is locked rigidly in the seated position by a series of balls located in a series of holes in the adapter body working in conjunction with cam surfaces on the outside diameter of the tool holder and the inside diameter of the sliding sleeve. The sliding sleeve is spring-loaded in such a way that the locking angle of the internal cam surface forces the balls into the cam surface of the tool body, thereby locking the tool holder in the seated position.

The full adapter travel also causes the transducer to output a signal to the machine CNC control. This signal immediately causes the spindle to rotate and feed the required axis to perform a milling operation measured from the surface of the workpiece.

When the milling operation is complete, the spindle axis is returned to the tool change position. At this time, if it is desirable to use the milling adapter in the locked position, the adapter can be stored in the automatic tool change magazine. If, however, a surface sense cycle is required, the next time the adapter can be reset by energizing an air valve which directs air to the spring-loaded piston in the transducer unit. This air pressure will apply a thrust load of sufficient force to the torque arm and sliding sleeve assembly to compress the springs holding the sliding sleeve in position, thereby releasing the cam lock arrangement, which will allow the tool holder to reset to its normal surface sensing position.

In the drawings, the same reference numerals are used throughout the several views and refer to the same parts, and the sectional views are taken looking in the direction of the arrows at the ends of the section lines.

Referring now to the drawings, I show.

Figure 1:
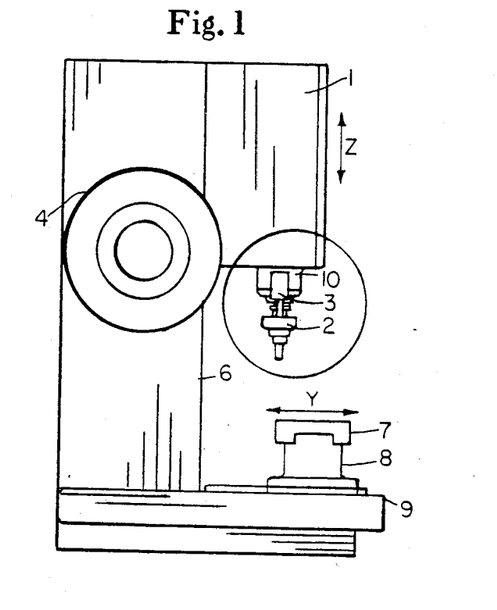
FIG. 1 is a side elevation of a machining center showing my invention inserted in the spindle.
Figure 2:
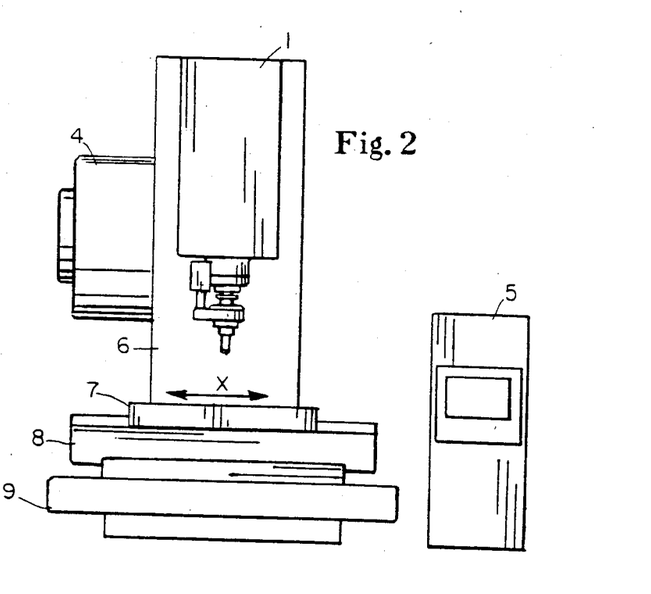
FIG. 2 is a front elevation of a machining center showing my invention from a different view.
Figure 3:
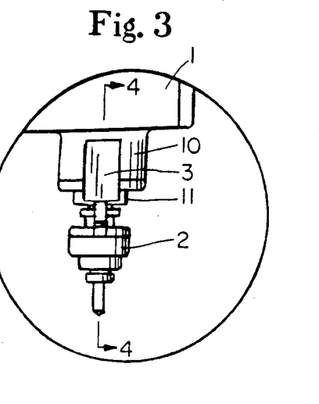
FIG. 3 is an enlarged view of the spindle area showing my invention in more detail.

Referring to the drawings, I show in FIGS. 1 and 2 a vertical spindle machining center having a base 9 supporting a moving saddle 8. The saddle motion is referred to as the Y axis. The saddle supports the workholding table 7. The table motion is referred to the X axis. The base 9 also supports the machine column 6. Mounted to column 6 is the automatic tool changer 4. Column 6 also provides a slidable mounting surface for the spindle headstock 1. The vertical motion of the headstock 1 is referred to at the Z axis. Referring now to FIG. 3, I show a spindle housing 10 at the lowering portion of headstock 1. Mounted to spindle housing 10 is transducer unit 3. Telescoping tool adapter 2 is retained in spindle 11 and is engaged with transducer 3. Referring again to FIG. 2, I show the CNC control 5.

Figure 4:
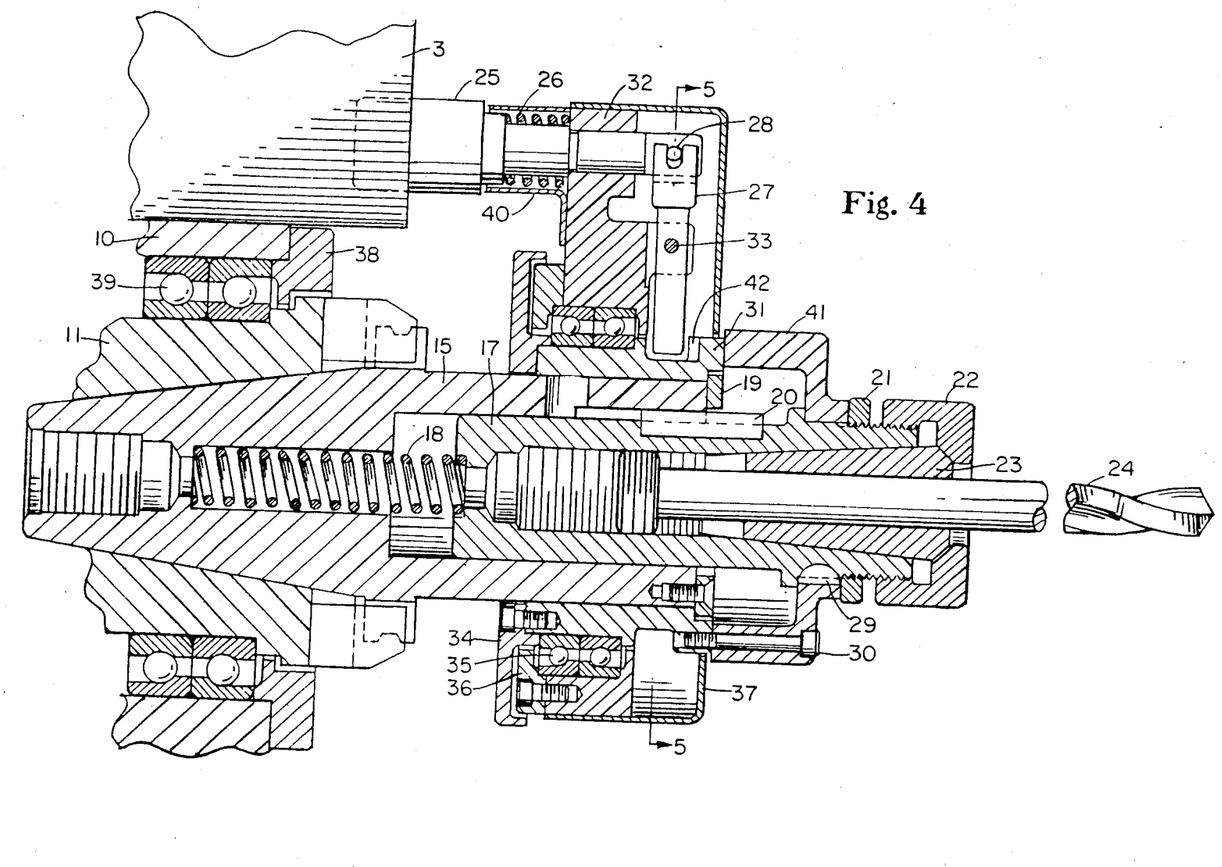
FIG. 4 is a section of the tool adapter portion of my invention that is arranged for drilling, taken along the line 4—4 of FIG. 3.

Referring to FIG. 4, I show a section through a telescoping tool adapter 2 arranged for drilling. The adapter comprises an adapter body 15 retained in spindle 11. Slidably supported in body 15 is tool holder 17 driven by key 20 and retained by retainer 19 against pressure from spring 18.

A drill 24 is clamped in collet 23 by collet lock unit 22. Tool holder 17 is axially and radially connected to sliding sleeve 31 by chip guard 41, key 29, chip guard lock unit 21 and screws 30.

The torque arm 32 is rotatably connected to sliding sleeve 31 by bearings 35 clamped in position by inner race bearing retainer 34 and outer race bearing retainer 36.

Torque arm plunger 25 compresses plunger spring 26 as plunger 25 is acted upon by a heavier spring located behind transducer piston in transducer unit 3. This action will cause the shoulder of plunger 25 to be seated against the face of the torque arm 32 while tool adapter assembly is being inserted in spindle 11. The end of the plunger 25 is precisely located in its seated position from the gage line of the spindle taper.

The seating of plunger 25 (shown in FIG. 4 in its seated position) causes the latching lever 27 to be pivoted about lever pin 33 thereby withdrawing end of lever 27 from locating notch in sliding sleeve 31. This permits free rotation of the tool adapter body during machining operations.

Latching lever 27 is protected from chips and coolant by cover 37 fastened to torque arm 32. Plunger spring 26 is protected by spring cover 40.

Figure 6:
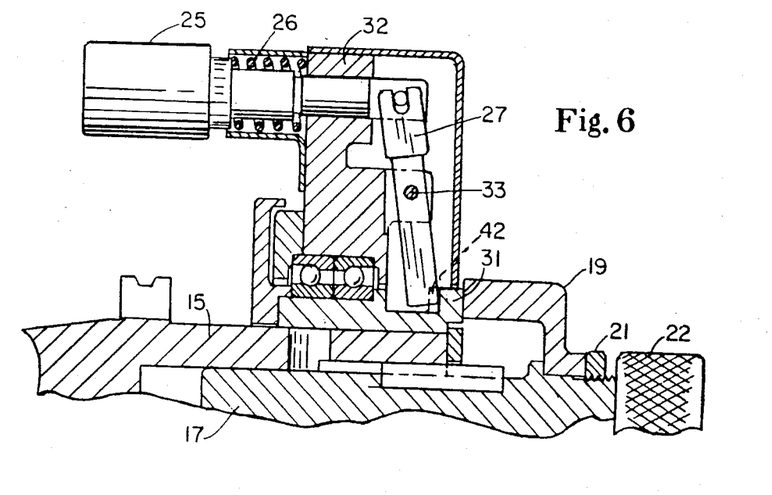
FIG. 6 is a section taken along the lines 6—6 of FIG. 5.

When the machining operations are complete, the spindle 11 is oriented radially for the automatic tool changer to remove the adapter. This orientation lines up notch 42 in sliding sleeve 31 with latching lever 27. In FIG. 6, I show latching lever 27 engaged with this notch 42 in sliding sleeve 31. The engagement takes place during adapter removal from spindle which causes the plunger 25 to withdraw from the transducer unit 3. During plunger withdrawal, plunger spring 26 unseats plunger 25 causing latching lever 27 to rotate about pin 33 so that end of lever 27 engages in notch 42 of sliding sleeve 31. This engagement prevents rotation, thereby retaining orientation between the torque arm 32 and the tool body 15 while the tool adapter is being handled by the automatic tool changer and stored in the tool magazine.

During the surface sensing operation, the spindle 11 is advanced toward the workpiece until drill 24 contacts the work surface. The spindle or Z axis will continue to advance, which will cause the tool holder 17 to telescope into adapter body 15 compressing spring 18. This motion will also cause the transducer unit 3 to advance on to plunger 25. The motion between the plunger 25 and transducer unit 3 will cause CNC control 5 (shown in FIG. 2 and FIG. 18) to decelerate the Z axis to zero velocity in the distance it takes the end of tool holder 17 to be seated solidly in tool adapter body 15. At this point, the Z axis will feed the drill 24 into the work to a depth measured from the work surface by the CNC control.

If the drill 24 should break before the depth is reached, spring 18 will cause tool holder 17 to unseat in tool body 15, thereby moving torque arm 32 and plunger 25 in relation to transducer unit 3. This motion will cause transducer unit 3 to send an error signal to the CNC control which will stop the cycle until the problem is corrected.

Figure 5:
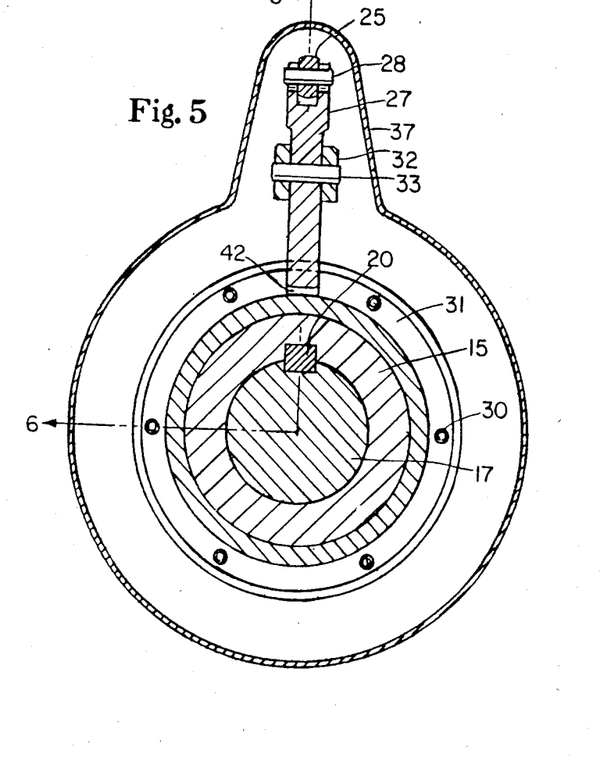
FIG. 5 is a section taken along the lines 5—5 of FIG. 4.

In FIG. 5, I show a section through tool adapter assembly showing latching lever 27 engaged in notch 42 of sliding sleeve 31. Also shown is a section through key 20 which transmits torque from tool adapter body 15 to tool holder 17 during machining operations.

Figure 7:
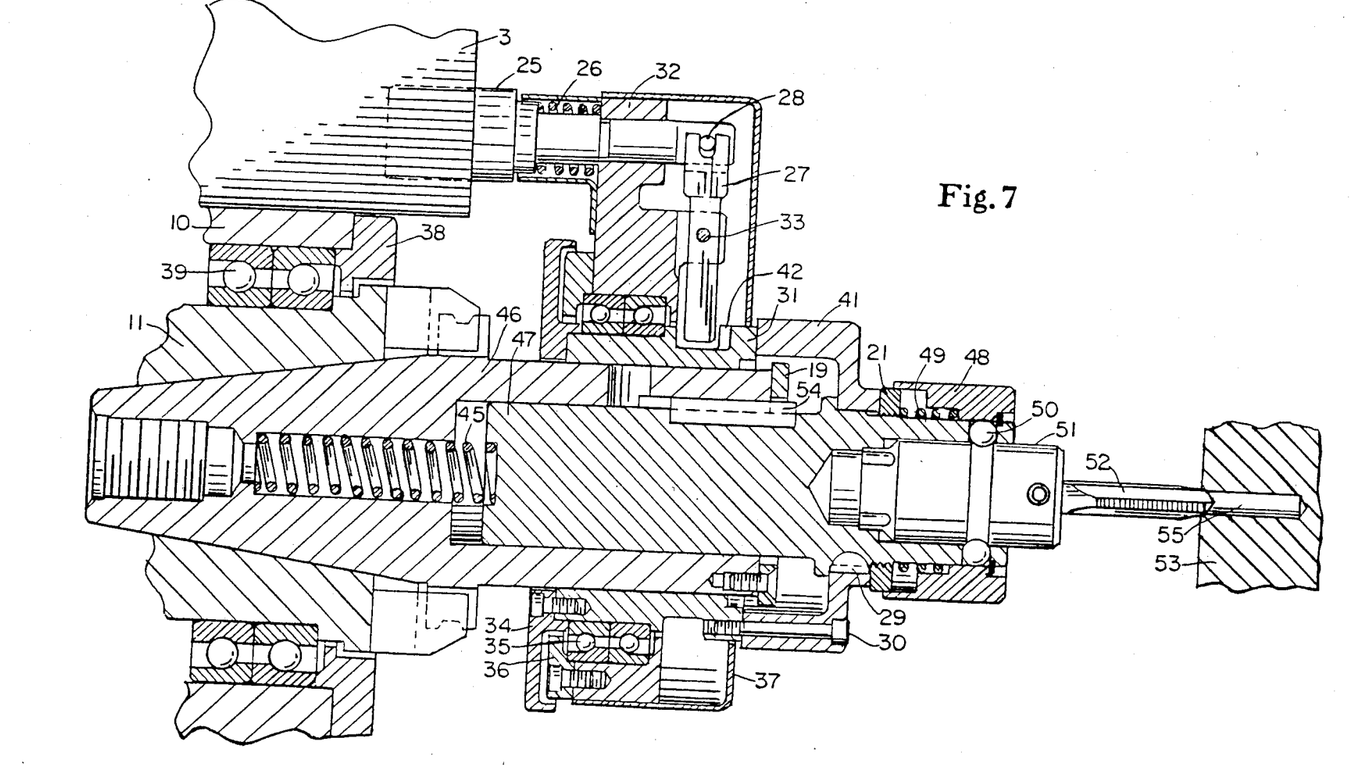
FIG. 7 is a section of the tool adapter portion of my invention similar to FIG. 4, partially compressed, that is arranged for tapping.

I refer now to FIG. 7, which shows a telescoping tool adapter 2 arranged for tapping. There are many of the same parts used in this adapter as are used in the drilling adapter shown in FIG. 4, such as the torque arm 32, plunger 25, plunger spring 26, latching lever 27, sliding sleeve 31, bearings 35, bearing retainers 34 and 36, chip guard 41, lock nut 21, key 29 and screw 30.

Specific parts for tapping are tool holder spring 45 which determines tapping thrust pressure against tool holder 47 which is slidably supported in adapter body 46. Tool holder 47 is driven by key 54 and retained by retainer 19. Locked into tool holder 47 by detent balls 5, which are held in position by collet 48, is tap driver 51 of the direct drive type or the torque limiting type. Tap 52 is retained and driven by driver 51.

The orientation latching lever 27 works in conjunction with the sliding sleeve notch 42 in the same manner as described for the drilling adapter.

During the surface sense tapping operation, the spindle 11 is advanced toward the workpiece 53 which has been prepared for tapping by having a previously machined hole 55 that is to be threaded by tap 52. Tap 52 is not rotating at this time. The spindle of Z axis will continue to advance, which will cause the tool body 47 to telescope into adapter body 46 compressing tap thrust spring 45. The amount of spring pressure can be varied by changing the compression rate of spring 45 to suit the size of tap 52.

The telescoping motion also causes the transducer unit 3 to advance on to plunger 25. The motion between the plunger 25 and transducer unit 3 will cause CNC control 5 in FIG. 2 and FIG. 18 to decelerate the Z axis to zero velocity in approximately half the travel the tool holder 47 has in the adapter body 46.

At this point, the spindle will start to rotate and the pressure determined by spring 45 will cause the tap to feed into hole 55 to a depth measured from the work surface by the CNC control. The rate of feed is determined by the pitch of tap 52 and rotational speed of spindle 11.

As tap 52 moves into hole 55, the tool holder 45 will start to move out of adapter body 46. This will again cause the plunger 25 to move in relation to transducer unit 3 causing the CNC control to start feeding the spindle or Z axis at the same rate, but slightly behind tap 52.

When the proper tap depth is reached, the spindle will reverse, which will cause the tap to back out of the hole. This action will push the tool holder 47 further into the adapter body 46, which will cause the plunger 25 to again move in relationship to transducer unit 3. This motion will signal the CNC control to reverse the motion of the Z axis, and the Z axis will follow the tap out of the hole until tap 52 is clear of the work surface.

If tap 52 should break before the proper depth is reached, the tool holder 47 will advance very rapidly if a portion of the tap is thrown clear, or it will stop advancing because a broken tap will not continue feeding. In either case, plunger 25 will move in relation to transducer unit 3 which will signal an out of synchronization condition to the CNC control, causing the cycle to stop until the problem is corrected.

Figure 8:
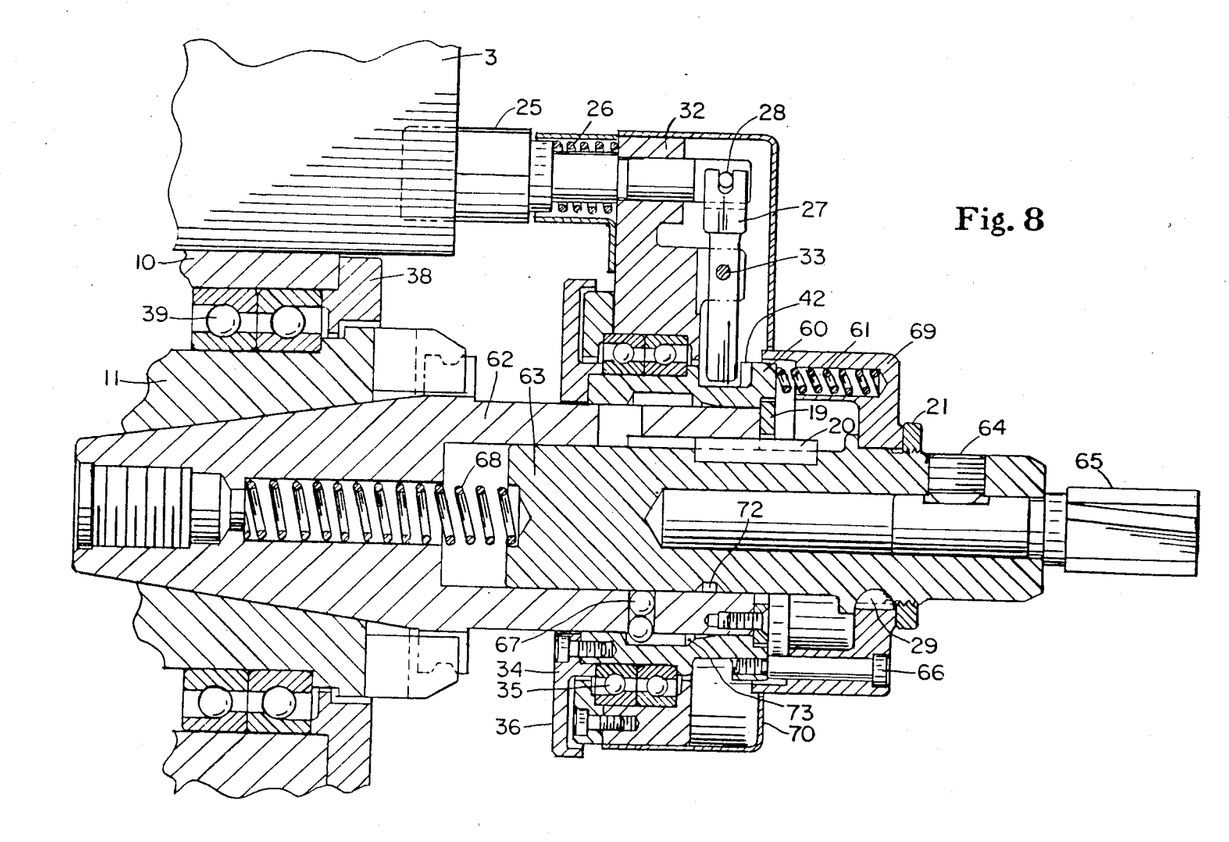
FIG. 8 is a section of the tool adapter portion of my invention similar to FIGS. 4 and 7 that is arranged for milling with the adapter extended.

I now refer to FIG. 8, which shows a telescoping tool holder arranged for milling. There are many of the same parts used in this adapter as are used in the drill adapter shown in FIG. 4, such as the torque arm 32, plunger 25, plunger spring 26, latching lever 27, bearings 35, bearing retainers 34 and 36.

Specific parts for milling are tool holder 63, which is slidably mounted in adapter body 62, driven by key 20 and retained by retainer 19. Tool holder 63 is arranged to drive milling cutter 65 and is connected to chip guard 69 by lock nut 21 and key 29. Chip guard 69 is slidably connected to sliding sleeve 60 by shoulder screws 66 and axially preloaded by springs 61. Tool holder locking balls 67 work in conjunction with a cam groove 72 on the outside diameter of tool holder 63 and a cam groove 73 on the inside diameter of the sliding sleeve 60.

The orientation latching lever 27 works in conjunction with sliding sleeve notch 42 in the same manner as described for the drilling adapter.

Figure 9:
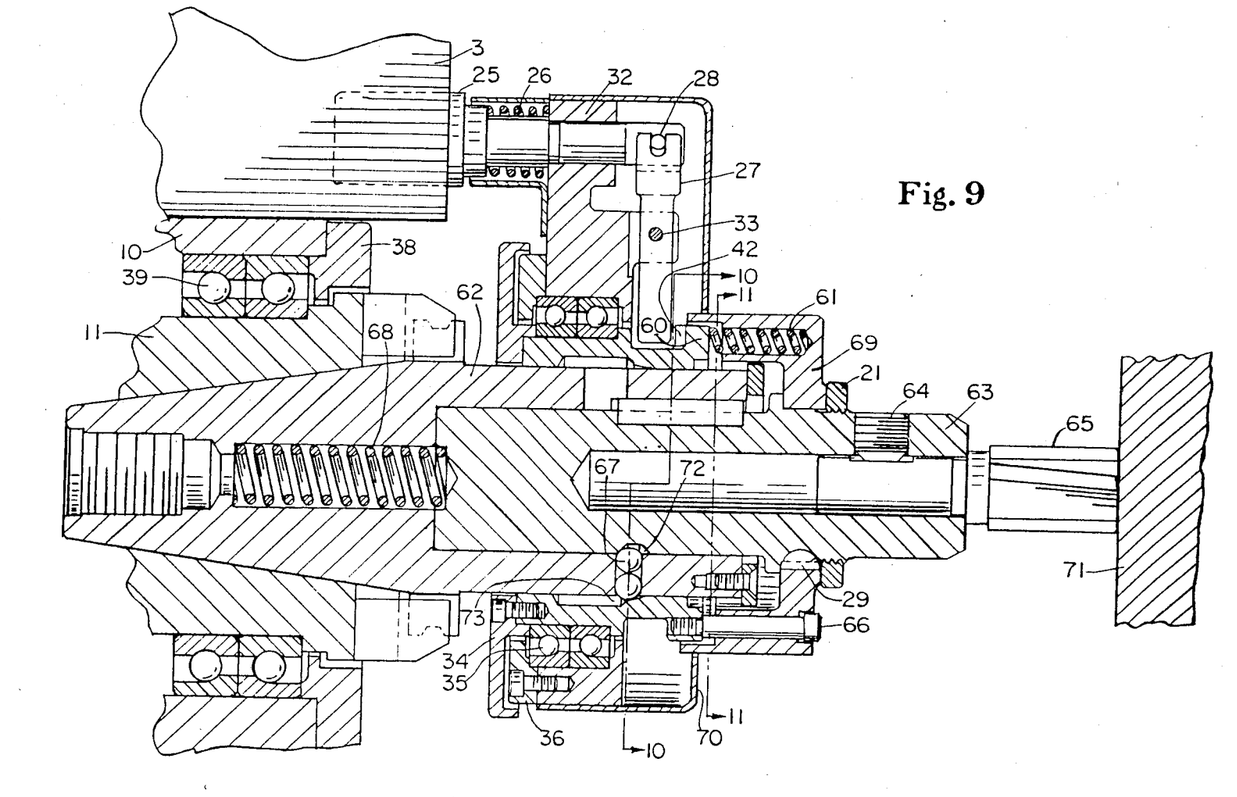
FIG. 9 is a section of the tool adapter portion of my invention similar to FIG. 8 that is arranged for milling with the adapter in a latched position.

In FIG. 9, I show the same milling adapter as shown in FIG. 8 after it has been advanced by Z axis until the cutter 65 contacting work surface 71 telescopes the tool holder 63 into adapter body 62 until end tool of holder 63 is seated solidly against bottom of bore and locking balls 67 working in a series of holes in adapter body 62 have been cammed into locking position into the outside diameter cam groove 72 of tool holder 65 by pressure from cam locking springs 61 against sliding sleeve 60 whose inside diameter cam groove 7 forms a locking angle so negative cutting forces from some types of milling operations cannot unseat tool holder 63.

The pressure from cam lock springs 61 and the seating effect this pressure causes against tool holder 63 by the cam actuated lock balls 67 is balanced against the pressure of spring 68 so as to prevent a rapid motion of tool holder 63 during the last increment of travel of tool holder 63 being seated in adapter body 62.

Figure 10:
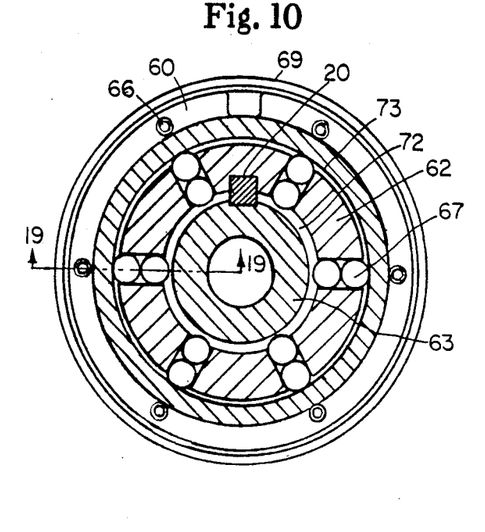
FIG. 10 is a section along the lines 10—10 of FIG. 9.

In FIG. 10, I show a section through the series of holes in adapter body 62 in which the locking balls 67 operate in conjunction with external cam groove 72 of tool holder 63 and external cam surface 73 of sliding sleeve 60 to form a very rigid means of maintaining the tool holder 63 in a positive position in adapter body 62.

Figure 11:
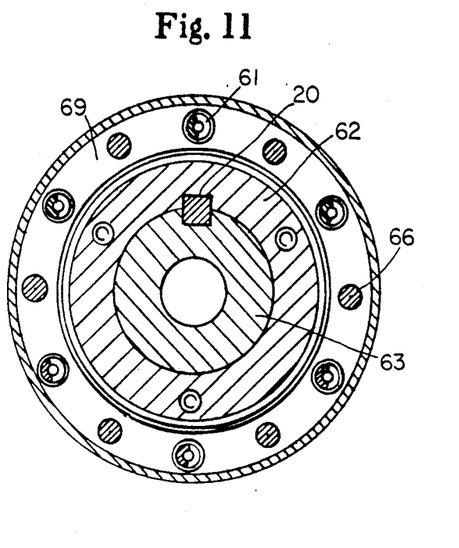
FIG. 11 is a section along the lines 11—11 of FIG. 9.

FIG. 11 is a section through a series of cam locking springs 61 which form a balanced force between chip guard 69 and sliding sleeve 60 (not shown).

Figure 19:
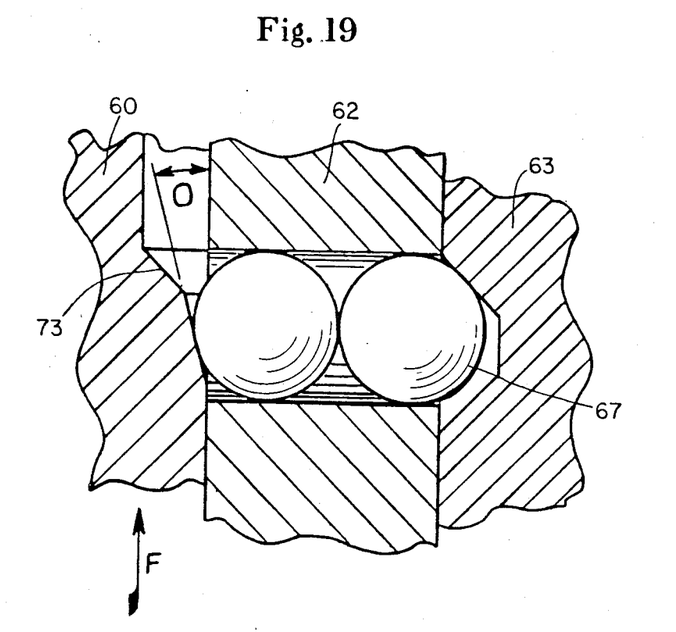
FIG. 19 is a section taken along the lines 19—19 of FIG. 10.

Referring now to FIG. 19, I show an enlarged section showing the locking balls 67 being acted upon by pressure caused by cam springs 61 shown in FIG. 9, creating force F against sliding sleeve 60 and cam locking angle 0 of internal cam locking groove 73. The cam locking angle 0 is steep enough to prevent any negative cutting forces applied aginst tool holder 63 from moving it from its seated position as shown in FIG. 9.

During a surface sense milling operation, non-rotating spindle 11 is advanced toward the workpiece 71 until the milling cutter 65 contacts the work surface. The spindle or Z axis will continue to advance causing the tool holder 63 to telescope into adapter body 62 compressing spring 68. During this motion, the chip guard 69 being connected axially to tool holder 63 moves sliding sleeve 60 along tool body 62 by spring pressure 61. Sliding sleeve 60 will continue to move in phase with tool 63 until internal cam groove 73 of sliding sleeve 60 contacts locking balls 67. At this point, the outside diameter groove 72 in tool holder 63 has not quite lined up with locking balls 67. Therefore, sliding sleeve 60 is momentarily stalled in its motion, which causes locking spring 61 to compress as the Z axis continues to feed. As the tool holder 63 approaches the seated position, its outside diameter cam groove 72 lines up with locking balls 67, permitting spring-loaded sliding sleeve 60 to advance, thus bringing the locking angle of internal cam groove 73 in line with locking balls 67 and rigidly locking and seating tool holder 63 in adapter body 62.

The telescoping motion of the tool holder 63 also causes motion between plunger 25 and transducer unit 3 which, in turn, will cause CNC control 5 (shown in FIG. 2 and FIG. 18) to decelerate Z axis to zero velocity in the distance it takes the end of tool holder 63 to be seated solidly in adapter body 62. At this point, control will be signalled to rotate the spindle 11 and feed the required axis to perform a milling operation measured from the surface of work piece 71.

After the milling operation is complete, the tool holder 63 can be unlocked from the telescoped position by air pressure being directed to the sliding piston in the transducer unit 3 described later. This air pressure is sufficient to overcome the pressure caused by locking springs 61, thereby moving sliding sleeve 60 along adapter body 62 until internal locking cam surface 73 of sliding sleeve 60 moves away from locking balls 67, permitting them to back out of outside diameter groove 72 in tool holder 63. This action permits spring 68 to return the tool holder 63 to the extended position, ready for the next surface sensing operation.

Figure 12:
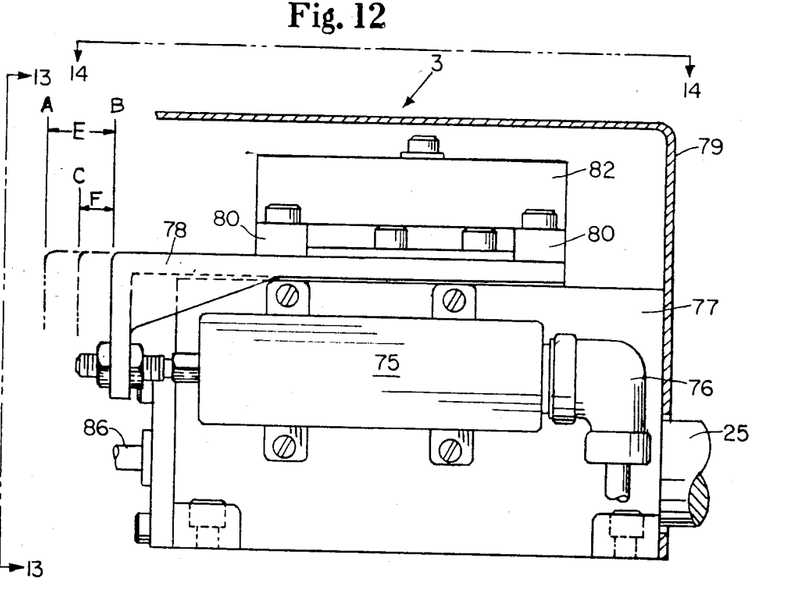
FIG. 12 is a side elevation of the transducer unit portion of my invention.

Referring now to FIG. 12, I show a side elevation of transducer unit 3 with transducer cover 79 cutaway. Torque arm plunger 25 is shown inserted in transducer cylinder 77. During surface sensing, the advancement of plunger 25 into cylinder 77 will cause transducer actuator 78 which is connected to actuating bars 80 to move with respect to transducer body 75. In both drilling and milling operations, actuator 78 will move from point B to point A through distance E. This is the distance required to firmly seat the tool holder in the adapter body. In surface sense tapping the actuator 78 will initially move from point B to point C through distance F. This is the distance that brings the tapping tool holder to the mid-point of its travel. During the tapping cycle the actuator 78 will move slightly to the right of position C while the tap is advancing into the workpiece and slightly to the left of position C while the tap is withdrawing from the workpiece. It should be noted that distance F and distance E may, in fact, be equal and the dimension of the distance traveled is determined by the spindle traverse rate and the response of the Z axis servo system.

Connected to transducer body 75 is cable connector 76 which provides means of communicating with the CNC control.

Figure 13:
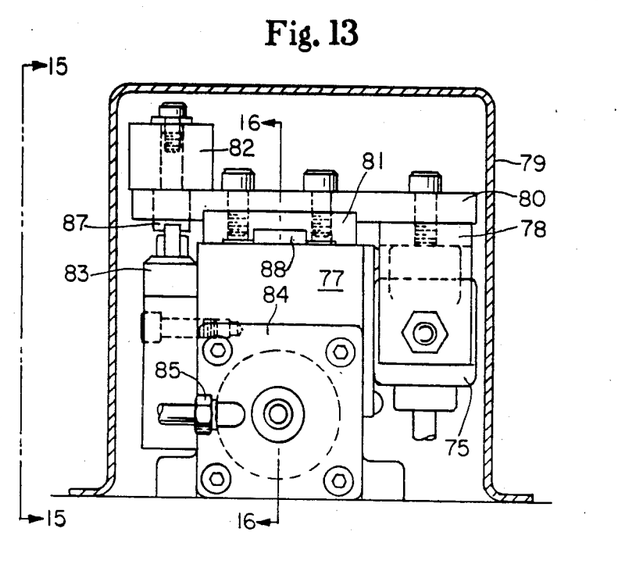
FIG. 13 is an end view taken along the lines 13—13 of FIG. 12.

Looking at an end view of the transducer unit in FIG. 13, I show transducer body 75 mounted to transducer cylinder 77 and transducer actuator 78 connected to actuator bars 80 which also have mounted to them the trip dog track 82. Trip dog 87 is adjustably located in track 82 and trip limit switch 83 which is mounted to cylinder 77. Mounted to that end of cylinder 77 is piston cap 84. Pneumatic fitting 85 is threaded into cap 84 and is used to supply air pressure to the piston when the milling adapter is to be unlocked.

Figure 14:
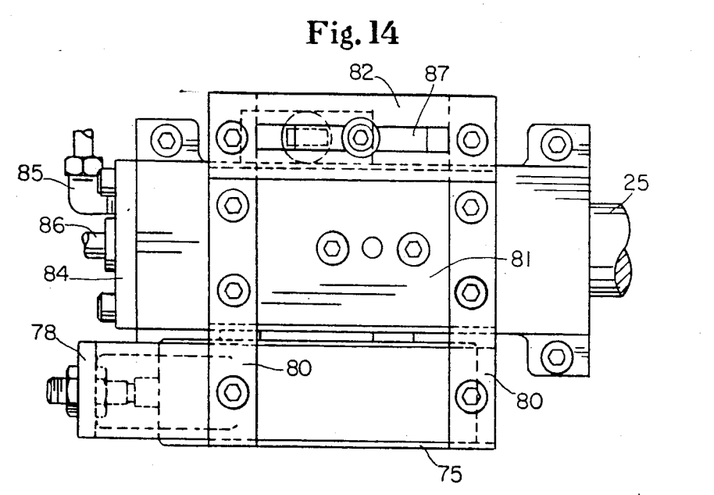
FIG. 14 is a top view taken along the lines 14—14 of FIG. 12.

Refer to plan view of the transducer unit in FIG. 14. I show the actuator bars 80 connected to bar adapter 81. Cam track 82 and transducer actuator 78 are also shown connected actuator bar 80.

Figure 15:
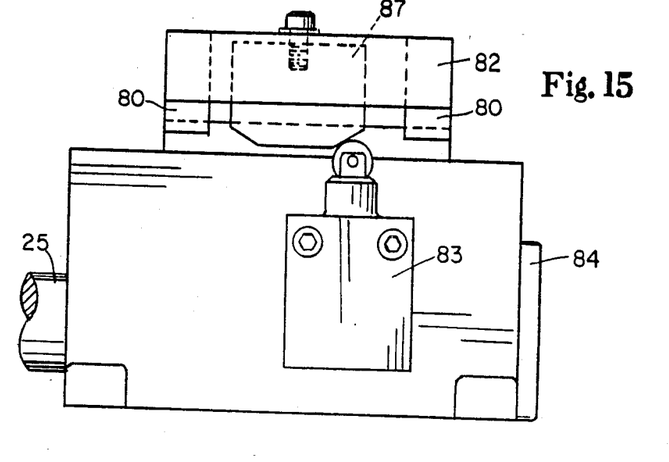
FIG. 15 is a side view taken along the lines 15—15 of FIG. 13.

FIG. 15 is a side view of the transducer unit and shows in more detail the trip dog 87 relative to precision limit switch 83 before the surface sense cycle has begun.

Figure 16:
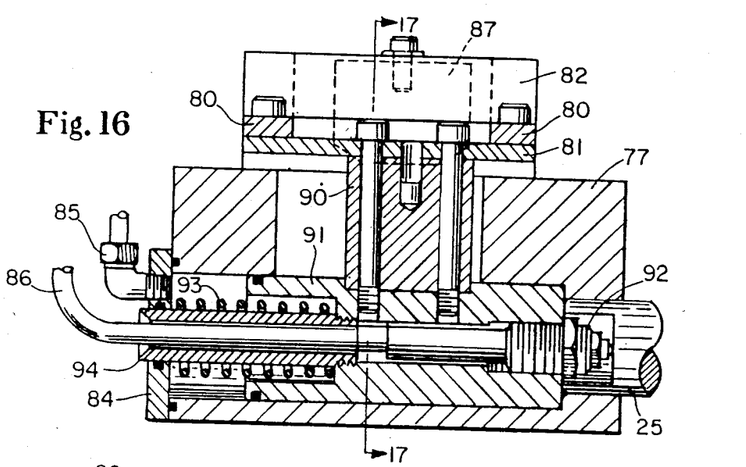
FIG. 16 is a section view taken along the lines 16—16 of FIG. 13.

I now refer to FIG. 16 which shows torque arm plunger 25 seated against piston 91 that is spring loaded by piston spring 93. Mounted in piston 91 is a tool preset limit switch 92 that is tripped by plunger 25. Piston 91 is slidably mounted in cylinder 77 and is connected to bar adapter 81 by piston key 90. Piston spring 93 is retained in position by piston cap 84 which is threaded to its pneumatic fitting 85. The piston cap 84 also provides a support and seal for piston spring guide 94.

Figure 17:
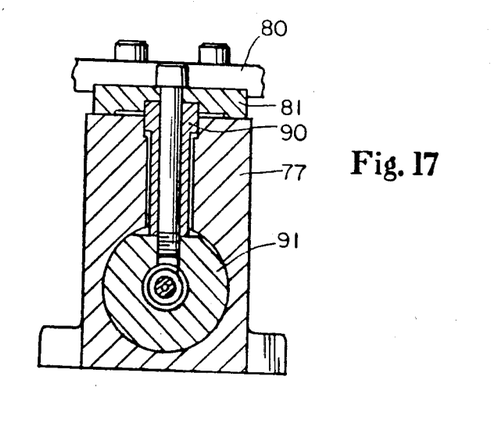
FIG. 17 is a section view taken along the lines 17—17 of FIG. 16.

FIG. 17 is a section taken through the piston 91 and cylinder 77 showing piston key 90 guided in the slot of cylinder 77 and connected to bar adapter 81.

Figure 18:
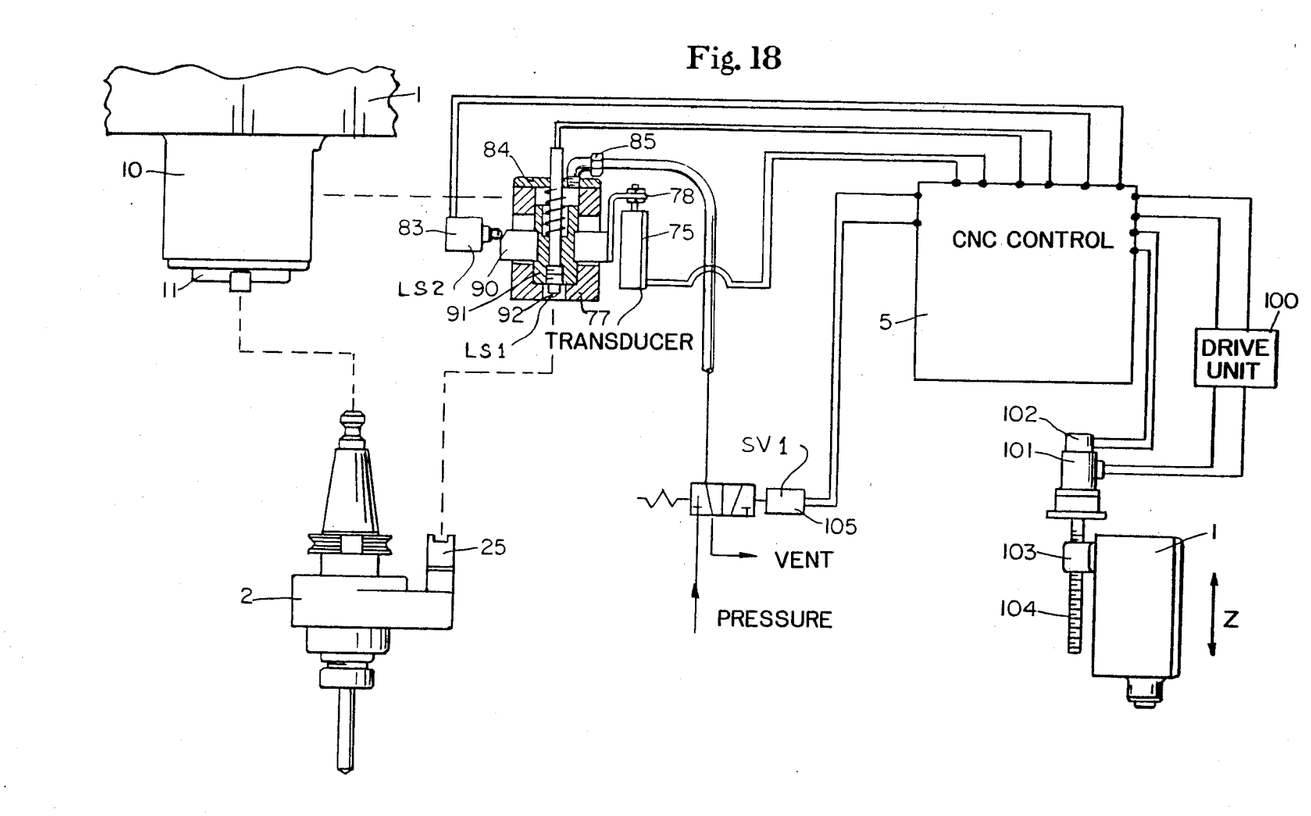
FIG. 18 is a mechanical, electrical and pneumatic schematic diagram of my invention.

FIG. 18 is a mechanical, electrical and pneumatic schematic diagram showing the operational relationship of the devices described earlier.

It can be seen the insertion of telescoping tool holder 2 into taper of spindle 11 will also cause insertion of plunger 25 into transducer cylinder 77 which is mounted adjacent to the spindle housing 10. This plunger insertion will trip tool preset limit switch 92 (or L.S. 1). During a surface sensing cycle, the Z axis headstock 1 is advanced toward the work surface. After the tool contacts the work, the Z axis will continue feeding, causing the tool adapter 2 to telescope, thus causing the transducer cylinder to move in relation to plunger 25, thereby unseating piston 91, which causes limit switch 83 (or L.S. 2) to be tripped and transducer actuator 78 to move in relation to transducer body 75. The output of these devices is connected to the CNC control and provides the operational signals previously described.

Also shown is a typical servo system comprised of a motor drive unit 100, a servo motor 101 with an integral feedback encoder 102. The motor 101 rotates a precision ballscrew 104 in ball nut 103 that is connected to Z axis headstock 1.

During operation, the rotation of the ball screw 104 causes the headstock 1 to advance or retract from the work-surface. This motion is measured by the encoder 102 sending position information to CNC control 5. The CNC control 5 through the encoder signal has complete control over the position and velocity of the Z axis headstock 1.

Also shown is pneumatic solenoid valve 105 (or SV 1) which is used to vent the cylinder chamber behind piston 91 during all surface sensing operations. After milling operations, the milling adapter is unlocked by energizing SV 1 which will direct air pressure to the spring side of piston 91 causing sufficient force to unlock that tool adapter mechanism.

Having thus described my invention, what I claim as new and useful and desire to secure by U.S. Letters Patent is:

1. In a machine tool adapter to be used in machining centers having computer numerical control and a spindle, said spindle controlled by computer numerical control, a spring loaded telescoping tool holder carried by said spindle, a tool adapter, an adapter body carried by said tool holder, a tool in said tool holder which contacts a work surface to cause the tool holder to telescope into the adapter body, a machine mounted electronic variable displacement transducer unit arranged to be actuated by telescopic motion of said tool holder, said transducer unit having electronic coupling means to the axis feed rate of the computer numerical control for controlling spindle deceleration from rapid traverse to slow traverse, said transducer producing a null signal when said tool holder is fully seated, said null signal transmitting work surface location to the computer numerical control to feed the spindle, tool holder and tool to a programmed depth into said work piece at a programmed feed rate.

2. The device described in claim 1 wherein said telescoping tool holder is connected to a non-rotating torque arm, an adapter body, a spring loaded plunger, said torque arm actuating said machine mounted transducer unit by said spring loaded plunger, a latching device comprising a plunger spring loaded lever mounted in said torque arm, said lever engageable in a slot in said adapter body to maintain said torque arm in relation to said tool adapter during tool storage, said latching device released upon insertion of said tool adapter into the machine spindle.

3. The device described in claim 1 wherein said spring loaded telescoping tool holder is arranged to drive taps and is partially compressed during deceleration to the null position of the transducer to locate the work surface to start rotation of the spindle in position to feed tap into the workpiece, said position transmitted to said transducer to signal the computer numerical control to advance the spindle into the workpiece at the tap feed rate to a programmed depth, said computer numerical control reversing said spindle rotation at the programmed depth displacing tranducer from the null position to permit retraction of the spindle to a programmed position relative to the workpiece.

4. The device described in claim 1 wherein said telescoping tool holder is adapted to drive milling cutters and is seated solidly in said tool adapter body during milling operation and is retained in the seated position independent of machining loads by means of a spring loaded ball locking mechanism comprising an external cam groove on said telescoping tool holder, a series of balls located in a series of holes in said adapter body, an internal cam groove with a locking angle working in conjunction with said balls, said internal cam groove being located in a sliding sleeve which is slidably connected to said tool holder, said sliding sleeve is rotatably connected to torque arm assembly, and is axially spring loaded with respect to said tool holder for the purpose of maintaining pressure on a locking cam angle against said balls which force the external cam in said tool holder to hold said tool holder rigidly seated in said adapter body during machining operation.

5. The device in claim 4 having a torque arm assembly comprising a sliding sleeve, a spring, a plurality of balls movable in a locking cam groove, said sliding sleeve movable against axial spring pressure to disengage said balls in said locking cam groove of said tool holder from seated position in said tool adapter body.

6. The device of claim 1 comprising a machining center for drilling, tapping and milling having a computer numerical control, a machine mounted transducer unit comprised of a sliding piston, a cylinder body, said piston slidably mounted in said cylinder body, a transducer actuator connected to said piston, a variable displacement transducer body connected to said cylinder body, a precision limit switch mounted to said cylinder body, means for actuating said precision limit switch and transducer slider upon movement of said piston, a spring to load said piston, a telescoping tool holder, a torque arm plunger on said tool holder, means for moving said piston with said torque arm plunger of said telescoping tool holder, a piston mounted limit switch for sensing the presence of said torque arm plunger when said tool adapter is inserted in the machine spindle, means for moving said piston with relative axial movement of said torque arm plunger as tool mounted in tool holder of said adapter contacts workpiece, said transducer being actuated by said piston movement to control the rate of spindle deceleration from rapid transverse to slow feed rate by an electronic couple to the spindle axis feed rate control of the numerical control unit.

7. The device described in claim 1, wherein a controllable pressure from said transducer unit exerts force on said torque arm and sliding sleeve to release said locking mechanism to permit said tool holder to return to the work sensing cycle position.

* * * * *